United States Patent [19]

Ljung

[11] 3,987,431

[45] Oct. 19, 1976

[54] DEVICE FOR ANALOGOUS REPRESENTATION OF ALPHA-NUMERICAL SIGNS DIGITALIZED IN COLUMNS

[75] Inventor: Bo Ljung, Kallhall, Sweden

[73] Assignee: Siemens Aktiengesellschaft, Munich, Germany

[22] Filed: Oct. 19, 1973

[21] Appl. No.: 407,939

[30] Foreign Application Priority Data

Nov. 1, 1972 Sweden ............................ 14166/72

[52] U.S. Cl. ............................ 340/324 AD; 178/30

[51] Int. Cl.² ............................................ G06F 3/14

[58] Field of Search ..... 340/324 A, 324 R, 324 AD, 340/324 M, 336, 334, 339; 178/30

[56] References Cited

UNITED STATES PATENTS

| | | | |
|---|---|---|---|
| 3,422,420 | 1/1969 | Clark | 340/339 |
| 3,426,344 | 2/1969 | Clark | 340/324 AD |
| 3,678,497 | 7/1972 | Watson et al. | 178/30 |

*Primary Examiner*—Marshall M. Curtis
*Attorney, Agent, or Firm*—V. Alexander Scher

[57] ABSTRACT

A device for analogous representation of alpha-numerical signs digitalized in columns has a sign generator for column digitalizing and a sample device for removing digital column informations from the sign generator and for supplying informations columnwise to an analogous representation device. The invention is particularly characterized by a control device for steering the sign generator and/or the sample device in such manner that the digital informations of each column are supplied at least twice in direct time sequence to the analogous representation device for analogous representation.

6 Claims, 15 Drawing Figures

Fig.8

DEVICE FOR ANALOGOUS REPRESENTATION OF ALPHA-NUMERICAL SIGNS DIGITALIZED IN COLUMNS

This invention relates to a device for the analogous representation of alpha-numerical signs digitalized in columns, having a sign generator for column digitalizing and a sample device for sampling digital column informations from the sign generator and supplying informations columnwise to an analogous representation device.

A device of this type is known, for example, through in German Pat. No. 2,108,241. In the device described therein column informations sampled by the sample device drop as so-called digital reproduction impulses. These digital reproduction impulses along with step-wise impulses which reproduce time duration of column digitalizing, are supplied to a superposition device which produced at the drop of a digital reproduction impulse an analogous voltage impulse of at least the duration of that reproduction impulse and with an amplitude corresponding to the immediate value of the step-wise impulse. Analogous voltage impulses produced in this manner with each digital reproduction impulse then serve as direct analogous deviation voltage for each writing ray of the analogous representation device, for example, the ink ray of an ink ray writer or the electron ray of an electron ray oscillograph. Due to the special deviation of the writing ray with the analogous voltage impulses thus created there is then produced upon the inscription carries of the representation device (paper strip for ink ray writer or tube image screen of electron ray oscillograph), a representation image of that alpha-numerical sign composed of horizontal lines.

A draw-back of this known device is that horizontal lines of the sign produced by the described process appear quite thin in the representing image.

Therefore, an object of the present invention is to improve the above-described device so that during image representation of individual signs stronger representing lines which are richer in contrast, are produced.

The objects of the present invention are realized by the use of the control device for steering the sign generator and/or the sample device in such manner that the digital informations of each column are supplied at least twice in direct time sequence to the analogous representation device for analogous representation.

In the device of the present invention the points of each column of a sign (column segments) are represented in total twice in direct sequence. Thus double lines are produced which provide totally a stronger more contrasting image impression, as is desired.

According to a special embodiment of the present invention the sign generator can be constructed, for example, so as to digitalize twice each sign column and the control device can be made to control the sample device so as to remove once each of the corresponding identical columns in time sequence. It is more advantageous, however, since simpler technically, to construct the sign generator for single column digitalizing of the sign and to correspondingly make the control device so that it will control the removal device for double removal of the same column in time sequence.

According to an embodiment of the present invention having a sample device with a column scanner and a column point feeler as well as the corresponding scanner frequency producers, the column feeler frequency of the column scanner at the column scanner frequency producer is so selected for a predetermined point scanning frequency of the column point scanner that a total of two scanner impulse sequences for each point scanning of a column appear between the appearance of two column scanning impulses following each other in time. If the signs are divided per column into n sign points and if the point scanning frequency of the point scanner is indicated at the point feeler frequency producer as the frequency value $F_1$, then the column scanner frequency producer should produce correspondingly a column scanner frequency having a frequency value $F_1 12(n+1)$. To produce this frequency the column scanner frequency producer consists advantageously of a first frequency reducing member switched behind the point scanner frequency producer which reduces the point scanner frequency $F_1$ to the value $F_2 = F_1/n+1$, and a second frequency reducing member switched behind the first frequency reducing member which reduces the frequency of the first frequency reducing member to the value $F_2/2$.

The invention will appear more clearly from the following detailed description when taken in connection with the accompanying drawings showing by way of example only, a preferred embodiment of the inventive idea.

Figure 3A:
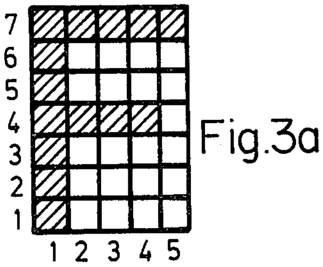
FIG. 3 is a diagram illustrating the creation of signal $Z_1$.

FIG. 3*a* is a diagram illustrating the reproducing of the letter F.

Figure 4:
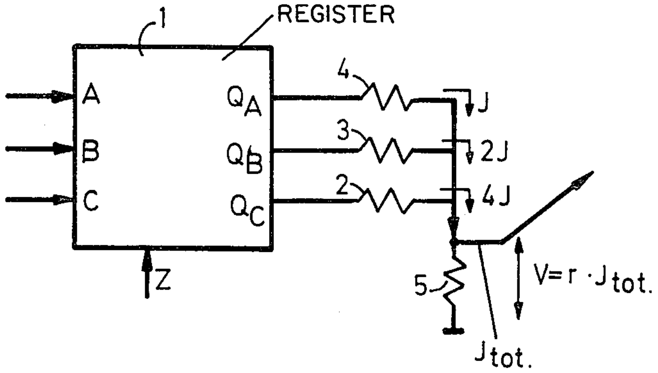

FIG. 4 shows a circuit having a register.

Figure 5:
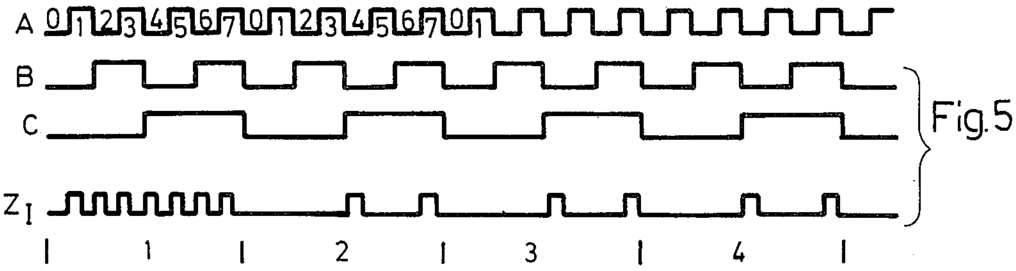

FIG. 5 is a diagram illustrating the digital reproducing impulses.

Figure 6:
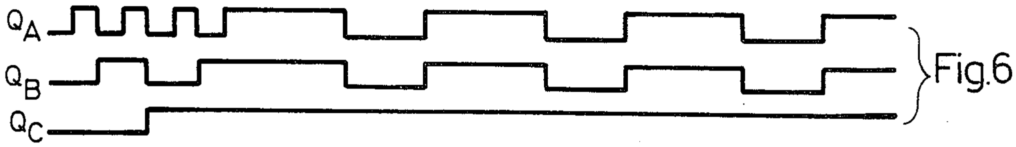

FIG. 6 is a diagram showing signals emanating from the register.

Figure 7:
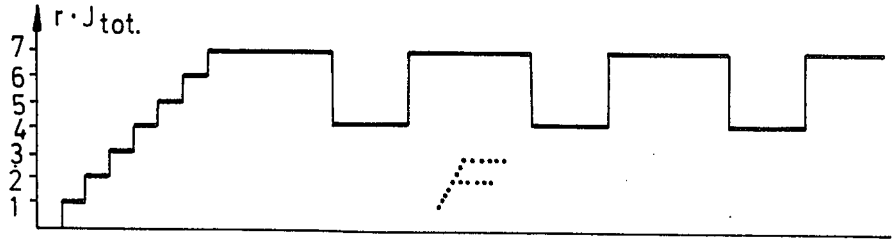

FIG. 7 is a diagram showing a superposing signal.

Figure 8:
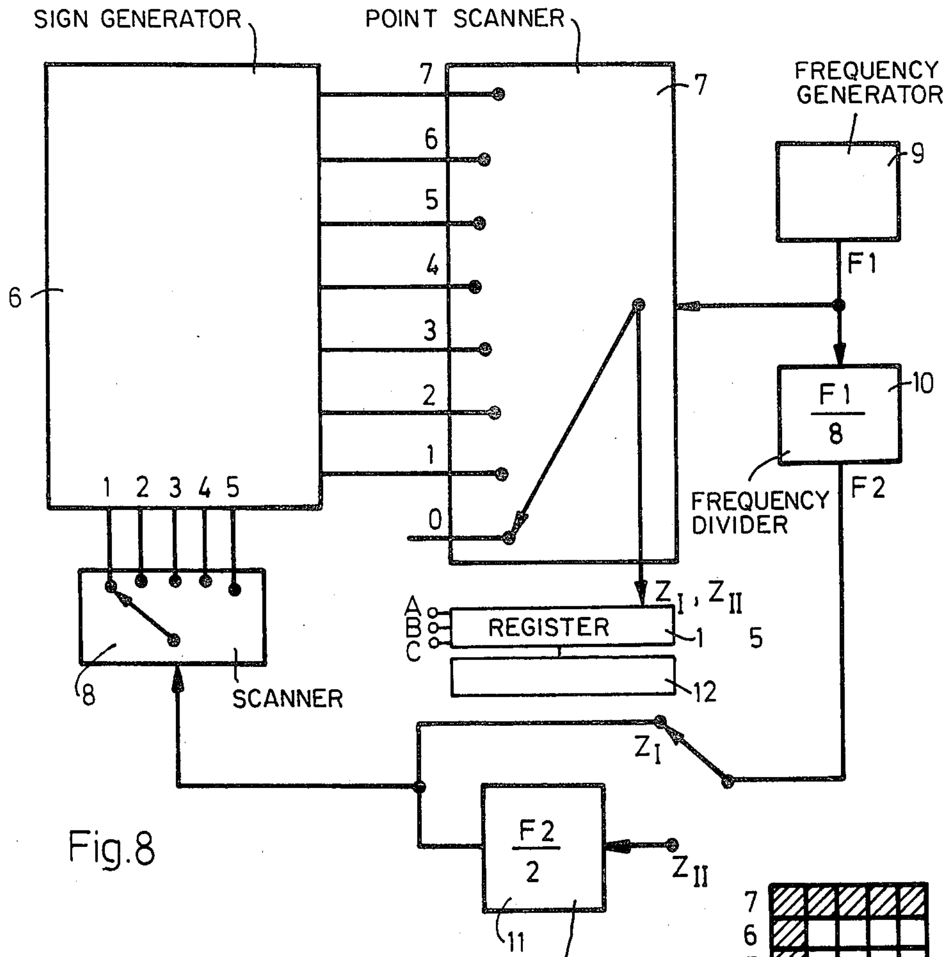

FIG. 8 is a circuit diagram illustrating a sign generator.

Figure 9:
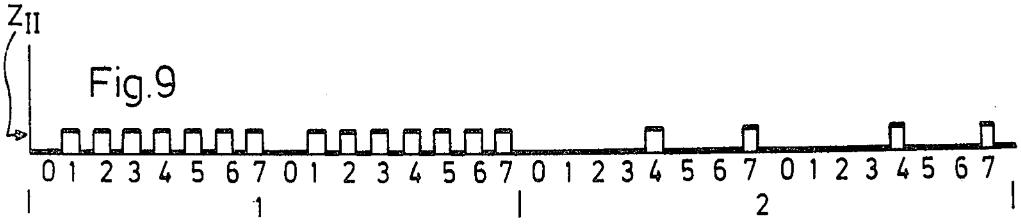

FIG. 9 is a diagram showing the creation of the signal $Z_{II}$.

Figure 10:
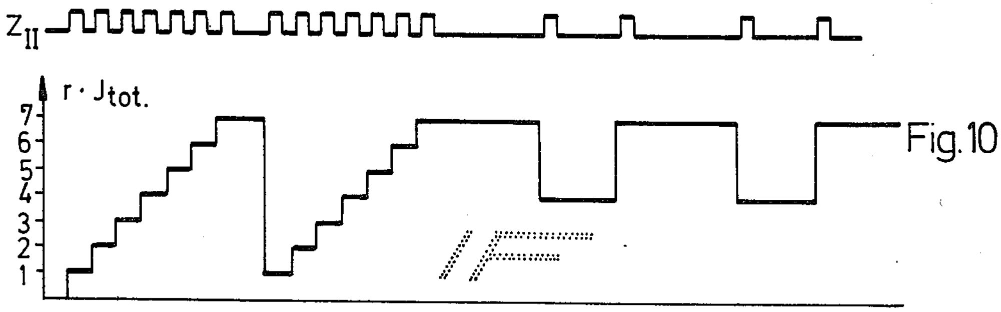

FIG. 10 is a diagram illustrating the passage of an analogous signal of the present invention.

Figure 11:
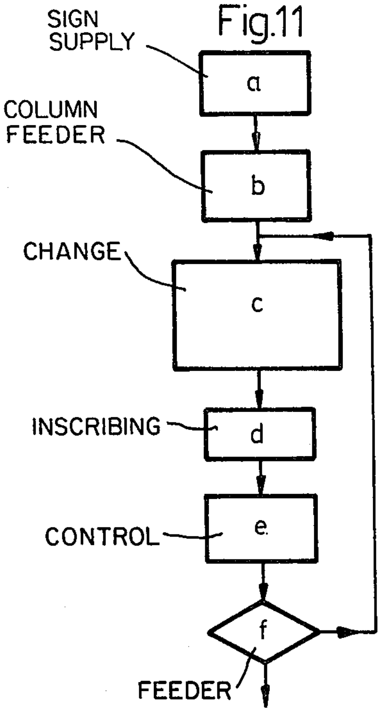

FIG. 11 is a block diagram illustrating a signal treatment.

Figure 12:
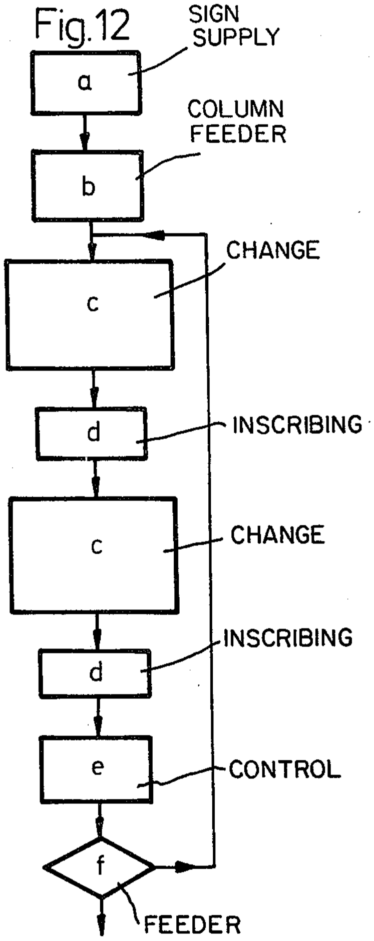

FIG. 12 is similar to FIG. 11 but shows a block diagram of signal treatment according to the present invention.

Figure 13:

FIG. 13 shows a row of letters produced by prior art process.

Figure 14:

FIG. 14 shows a row of letters produced by the process of the present invention.

Figure 1:
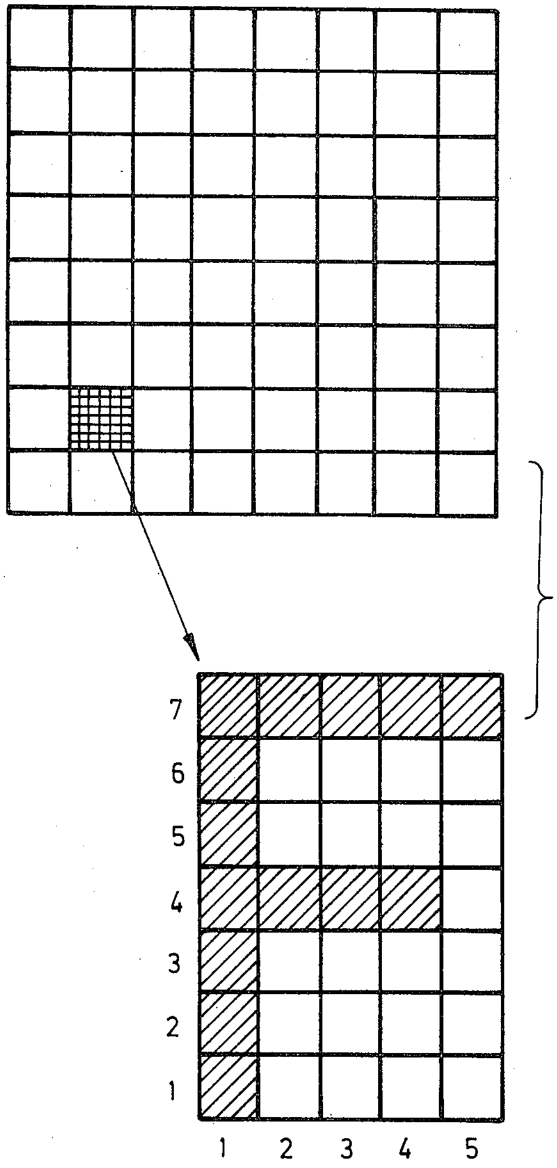
FIG. 1 is a diagram showing a matrix with a programmed sign.

In the embodiment of the present invention shown in the drawings the digitalizing of signs takes place in a sign generator (FIG. 8) which will be described in detail later on, which is a firmly programmed electronic accumulator and contains 64 signs. Each sign is represented by a matrix with closed and open points. The sign is constructed from closed points. FIG. 1 shows as example a matrix with programmed sign (letter) F.

Figure 2:
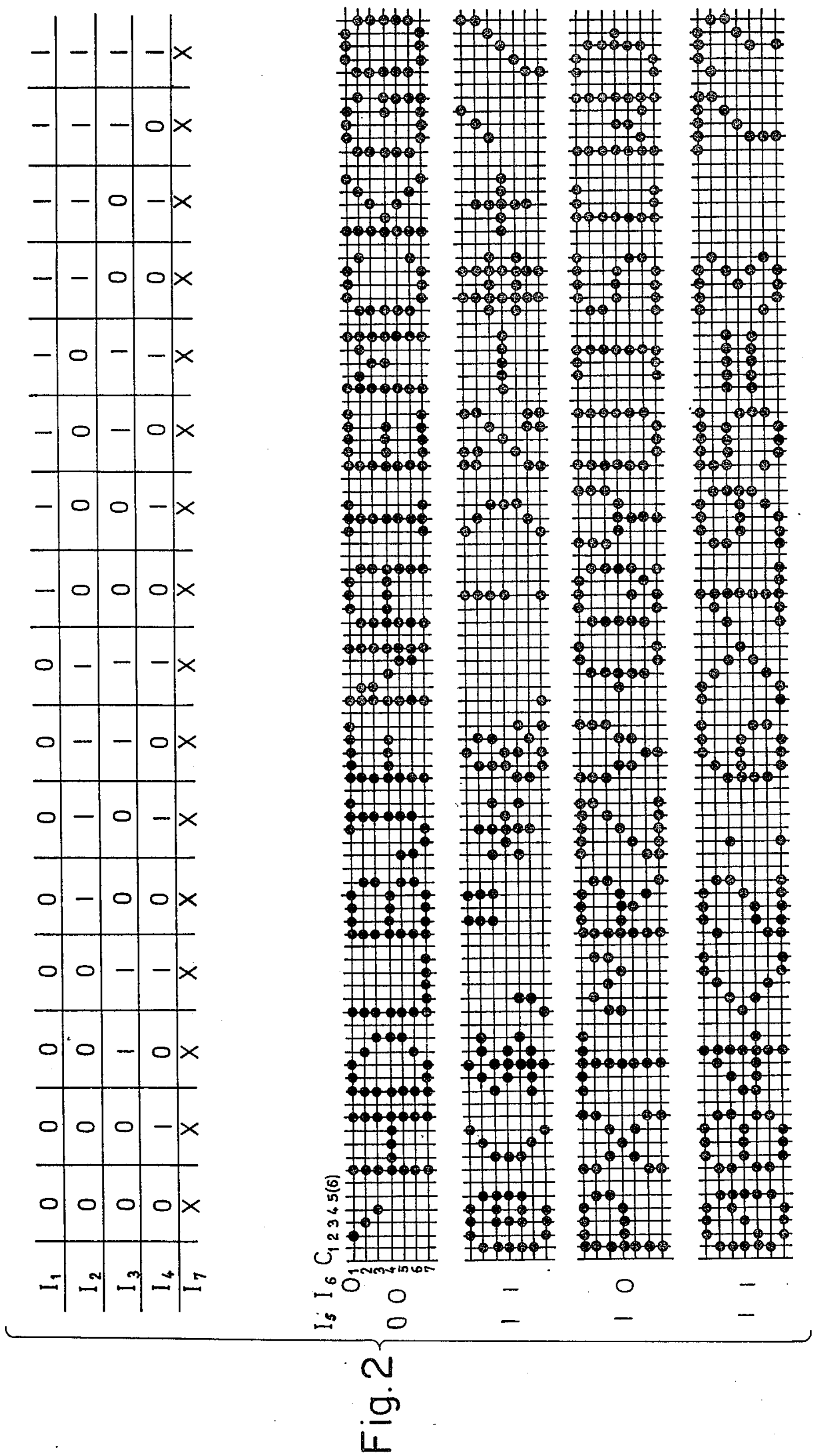
FIG. 2 is a diagram showing the code for all 64 signs including the corresponding matrix.
Figure 3:
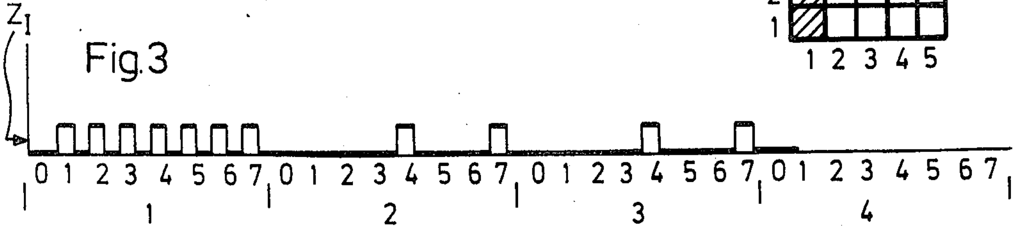

From the sign generator is selected a desired sign matrix through a 6-bit binary code. FIG. 2 shows the code for all 64 signs as well as the corresponding matrix. The delivery of the selected sign matrix takes place in that the columns are felt one after the other by a column feeler (FIG. 8). The individual points in each column are felt by a point feeler (FIG. 8), whereby closed matrix points are transmitted into voltage impulses of uniform size (1-signals), which open matrix points are represented by the unchanged condition of the outgoing signal, i.e. 0-signals. FIG. 3 shows, for example. that the sign F is reproduced by an outgoing signal $Z_I$ the extent of voltage of which as functions of time corresponds to sign carrying, respectively free points of the actual column. The impulses of the signal $Z_I$ correspond to the already mentioned digital reproducing impulses of the device described in the German Pat. No. 2,108,241 for the letter F (FIG. 3*a*).

The thus produced signal $Z_I$ according to FIG. 3 is supplied to the register 1 shown in FIG. 4 (superposition device). This register 1 also receives a 3-bit binary code synchronized with this signal running through decimal values one to seven. The binary code is supplied to the inlets A, B, C of the register 1, while the signal $Z_I$ is given to the separate steering inlet Z of the register 1. FIG. 5 shows the timely runs of the inlet impulse sequences of 3-bit binary code and the digital reproducing impulses $Z_I$ at the inlets A,B,C, resp. $Z_I$. The voltage values of the 3-bit binary code impulses received at the inlets A, B, C of the register 1 are then stored therein, even though the incoming signal $Z_I$ has voltage at the same time and is an I signal. The last read signal value at the inlets A, B, C is stored until either the incoming signal $Z_I$ has again voltage, whereby the stored signal value is then replaced by a simultaneously coming new signal value, or until the column feeler is switched over, whereby the signal value 0 is initially stored. On the basis of such a transposition mechanism at the outlets $O_A$, $O_B$, $O_C$ of the register 1 are produced the outgoing signals $O_A(t)$, $O_B(t)$ and $O_C(t)$ illustrated in FIG. 6. These signals are then changed in a digital analogous transformer into analogous voltage. The digital analogous transformer consists of three ohmic resistances 2, 3, 4, whereby the resistance 2 has the resistance value R, the resistance 3 the resistance value 2R and the resistance 4 the resistance value 4R (weighing in dual code). The resistances 2 to 4 are grounded at the outlets by a low ohmic resistance 5. Due to the special amplitude weighing of the individual signal sequences $O_A(t)$, $O_B(t)$, $O_C(t)$ by the resistances 2 to 4 there is produced through the resistance 5 a superposing signal $r.\ I_{tot}$ according to FIG. 7, whereby $r$ is the low ohmic value of resistance 5 and $I_{tot}$ represents the total current flowing through the resistance 5. The analogous signal shown in FIG. 7 corresponds to the initially described analogous voltage impulses for the direct guiding of an ink ray or electronic ray over the corresponding inscription carrier.

FIG. 8 is a circuit diagram showing the principles of the device of the present invention. A sign generator indicated by the numeral 6 is the one above described and formed as a firmly programmed electronic storer. A column point scanner 7 and a column scanner 8 are connected with the sign generator 6 and constitute a sign removing device. A frequency generator 9 produces the point scanner frequency $F_1$ which is used for operating the point scanner 7 and at the same time determines the speed with which the signal Z is to be delivered from the sign generator. In a frequency divider 10 is produced with the reducing ratio 1:8 from the point feeling frequency $F_1$ the frequency $F_2 = F_1/8$. Up to now this frequency $F_2$ served as the direct operating frequency for the column scanner 8. However, since according to the present invention a repeat of the signal treatment is desired in each column, it is necessary that during the time of the switching of the column scanner 8 from one sign column to the following one, the respective column should be felt a total of two times one after the other by the point scanner 7. For that purpose a second frequency divider 11 with the reducing ratio 1:2 is provided for the frequency divider 10. When this second frequency divider 11 is switched between the column scanner 8 and the first frequency divider 10, the change in columns will take place with half speed, thereby producing the desired effect, namely, the double point scanning of each column before switching over to the following one. Contrary to prior art, the outgoing signal for the letter F, for example, at the point scanner 7 will not indicate any more the time duration $Z_1$ according to FIG. 3, but a time duration $Z_{II}$ according to FIG. 9. In a similar manner, after the passage of the reproducing impulse sequence $Z_{II}$ thus created through the device 1 to 5 connected after the point scanner 7, which corresponds precisely to the register arrangement of FIG. 4, an analogous signal running according to FIG. 7 is not produced any more, but the signal will extend according to FIG. 10. This new signal passage produces then the direct deviation voltage of the writing ray of the analogous representing device 12, for example, an ink ray of an ink ray writer or an electronic ray of an electronic ray oscillograph.

Due to frequency reduction of 1:2 the sign writing consumes twice as much time as heretofore (FIG. 7). To compensate for this the point feeling frequency $F_1$ can be doubled and then the maximum writing speed will be diminished to one half by the additional frequency divider 11.

FIG. 11 is a block diagram for the signal treatment without the additional frequency diminution 1:2. The individual process steps mean the following:

*a* = supply of a new sign,
*b* = column feeder is supplied to column 1,
*c* = change of the present column information into analogous series of signals,
*d* = inscribing,
*e* = control of column number. If the number is not six, the process *a b c* is repeated whereby after reading the column six a new sign is selected and the entire procedure is repeated.

FIG. 12 shows on the other hand the signal treatment of the present invention for producing the double inscription. This process differs from the process according to FIG. 11 merely in that the inner closed operating strip is provided with two further blocks *c* and *d;* these blocks are intended to indicate the doubling of the process step *c*, namely the change of the column information into analogous series of signals and of the process step *d*, namely the inscribing.

FIGS. 13 and 14 show two writing samples of alphanumerical signs. FIG. 13 shows the simple inscription of signs produced by devices known in prior art. FIG. 14 on the other hand shows the double inscription with greater contrast produced by the device of the present invention.

The present invention is not limited to the disclosed embodiment but also covers various changes within the scope of the attached claims.

I claim:

1. A device for analogous repesentation of alphanumerical signs digitalized in columns, comprising sign generator means for column digitalizing, sample means, analogous representation device, said sample means sampling digital column informations from the sign generator means and supplying informations column-wise to said analogous representation device, and a control device connected with and controlling at least one of said means for supplying digital informations of each column at least twice in direct time sequence to said analogous representation device for analogous representation.

2. A device in accordance with claim 1, wherein the sign generator means comprise means for double digitalizing of each sign column and wherein the control device operates the sample means to provide a single sample of each of the corresponding identical columns in time sequence.

3. A device in accordance with claim 1, wherein the sign generator means comprise means for single column digitalizing of a sign and wherein the control device operates the sample means to provide a double sample of the same column in time sequence.

4. A device in accordance with claim 3, wherein said sample means comprise a column scanner, a column point scanner and corresponding scanning frequency producers, and wherein, for a given point scanning frequency of the column point scanner, the column scanning frequency for the column scanner at the column scanner frequency producer is so selected thaat, between the appearance of two column scanner impulses which follow each other, there is a total of two scanning impulse sequences for each point scanning of a column.

5. A device in accordance with claim 4, wherein the sign per column is divided into n sign points and the point scanning frequency of the point scanner at the point scanner frequency producer has the frequency value $F_1$, the column scanner frequency producer producing a column scanning frequency with the value $F_1/2(n+1)$.

6. A device in accordance with claim 5, wherein the column scanning frequency producer comprises a first frequency reducing member connected behind the point scanning frequency producer and a second frequency reducing member connected behind the first frequency reducing member, the first frequency reducing member reducing the point scanning frequency $F_1$ to the value $F_2=F_1/n+1$, and the second frequency reducing member reducing the frequency of the first frequency reducing member to the value $F_2/2$.

* * * * *